(12) United States Patent
Bos

(10) Patent No.: US 11,846,872 B2
(45) Date of Patent: Dec. 19, 2023

(54) NIGHT VISION PRESERVING CASE FOR USE IN ASSOCIATION WITH AN ELECTRONIC DEVICE

(71) Applicant: Mark Bos, West Olive, MI (US)

(72) Inventor: Mark Bos, West Olive, MI (US)

( * ) Notice: Subject to any disclaimer, the term of this patent is extended or adjusted under 35 U.S.C. 154(b) by 23 days.

(21) Appl. No.: 17/590,023

(22) Filed: Feb. 1, 2022

(65) Prior Publication Data
US 2023/0244124 A1    Aug. 3, 2023

(51) Int. Cl.
  *G03B 15/05*  (2021.01)
  *H04M 1/22*  (2006.01)
  *H04M 1/02*  (2006.01)

(52) U.S. Cl.
  CPC .......... *G03B 15/05* (2013.01); *H04M 1/0264* (2013.01); *H04M 1/22* (2013.01); *G03B 2215/0592* (2013.01); *H04M 2250/52* (2013.01)

(58) Field of Classification Search
  CPC ........................ G03B 15/05; G03B 2215/0592
  See application file for complete search history.

(56) References Cited

U.S. PATENT DOCUMENTS

| | | |
|---|---|---|
| 7,581,893 B2 | 9/2009 | Miramontes |
| 7,949,242 B2 | 5/2011 | Yang et al. |
| 8,342,325 B2 * | 1/2013 | Rayner .................. A45C 11/00 206/320 |
| 8,724,020 B1 | 5/2014 | Haddad |
| 8,989,826 B1 | 3/2015 | Connolly |
| 9,001,176 B2 * | 4/2015 | Springer ............. H04M 1/0264 348/14.02 |
| 9,078,498 B2 | 7/2015 | Richardson et al. |
| 9,369,170 B2 | 6/2016 | Sorrentino |
| 10,003,371 B1 | 6/2018 | Given et al. |
| 10,058,155 B2 | 8/2018 | Guerdrum et al. |
| 10,082,725 B1 * | 9/2018 | Penaflor ................. G03B 15/03 |
| 10,103,769 B2 | 10/2018 | Witter et al. |
| 10,317,776 B2 | 6/2019 | Gustaveson, II |
| 10,355,735 B2 * | 7/2019 | Ranjeva ............... H04B 1/3888 |
| 10,362,847 B1 | 7/2019 | Okada et al. |
| 10,863,062 B1 | 12/2020 | Molina et al. |
| 2012/0320501 A1 | 12/2012 | Ackloo |
| 2014/0057687 A1 | 2/2014 | Yoo |
| 2014/0119718 A1 | 5/2014 | Oh et al. |
| 2015/0146401 A1 | 5/2015 | Su et al. |

(Continued)

FOREIGN PATENT DOCUMENTS

CN    205945826 U    2/2017

OTHER PUBLICATIONS

World, Monila. "l." YouTube, YouTube, May 27, 2021, https://www.youtube.com/watch?v=V8sjRbzmB-c. (Year: 2021).*

(Continued)

*Primary Examiner* — Clayton E. LaBalle
*Assistant Examiner* — Diana Hancock
(74) *Attorney, Agent, or Firm* — King & Partners, PLC

(57) ABSTRACT

A case for use in association with an electronic device having a camera system with a flash that can serve as a flashlight, including: (a) a case body, wherein the case body is adapted to releasably retain the electronic device; and (b) a cover member, wherein the cover member is adapted to enable a person to use the flash of the camera system as a flashlight while simultaneously preserving his/her night vision.

17 Claims, 16 Drawing Sheets

(56) References Cited

U.S. PATENT DOCUMENTS

2017/0295340 A1\* 10/2017 Metrani ........... H04N 21/42204
2019/0327354 A1\* 10/2019 Li .......................... G03B 15/05

OTHER PUBLICATIONS

World, Monila. "MONILA Color Filter for Mobile Devices' Flashlight Cameras." Kickstarter, Jan. 14, 2022, https://www.kickstarter.com/projects/monila/monila-color-filter-for-mobile-devices-flashlight-and-cameras/description. (Year: 2022).\*

\* cited by examiner

NIGHT VISION PRESERVING CASE FOR USE IN ASSOCIATION WITH AN ELECTRONIC DEVICE

BACKGROUND OF THE INVENTION

1. Field of the Invention

The present invention relates in general to cases, enclosures, and/or assemblies, and, more particularly, to those used in association with electronic devices (e.g., smart phones, Apple iPhones, Samsung Galaxy, tablets, Apple iPads, Microsoft Surface Pros, etcetera) having camera systems that enable a person to use the flash of the camera system as a flashlight while simultaneously preserving his/her night vision. When used with an electronic device, the night vision preserving cases of the present invention eliminate the need for a secondary and/or stand-alone flashlight in, for example, aviation, hunting, and military applications—just to name a few.

2. Background Art

Cases and enclosures for electronic devices have been known in the art for years and are the subject of a plurality of patents and publications, including: U.S. Pat. No. 10,863,062 entitled "Apparatus to Cover Front and Rear Mobile Device Cameras," U.S. Pat. No. 10,362,847 entitled "Lens for Protective Case," U.S. Pat. No. 10,103,769 entitled "Protective Enclosure for an Electronic Device," U.S. Pat. No. 10,058,155 entitled "Protective Case System," U.S. Pat. No. 9,369,170 entitled "Mobile Device Case with Movable Camera Cover," U.S. Pat. No. 9,078,498 entitled "Holder," U.S. Pat. No. 7,581,893 entitled "U-Cover Camera Phone," U.S. patent application Publication Number 2015/0146401 entitled "Case for a Portable Electronic Device Having a Cable to Electrically Couple the Portable Electronic Device to an External Device," U.S. patent application Publication Number 2014/0057687 entitled "Cellular Phone Case," and Chinese Patent Number CN205945826 entitled "Cellphone Camera Lens Cover"—all of which are hereby incorporated herein by reference in their entirety including all references cited therein.

U.S. Pat. No. 10,863,062 appears to disclose an apparatus to cover mobile device cameras including a cover assembly. The cover assembly includes a rear camera cover and a front camera cover. The rear camera cover is adapted to cover the rear camera of a mobile device and the front camera cover is adapted to cover the front camera of the mobile device. The cover assembly further includes an actuating member that urges front camera cover and rear camera cover to the front camera and rear camera respectively. Furthermore, the camera assembly covers both the front and rear camera while maintaining the functionality of the speaker and microphone on a mobile device. Additionally, the cover assembly provides an opening for the flash component on a mobile device to allow a user to still use the flash of a mobile device. The apparatus may also cover additional components and sensors such as microphones, charging ports, and speakers.

U.S. Pat. No. 10,362,847 appears to disclose a protective case for an electronic device having a camera and a microphone. The protective case includes a lens assembly that comprises a transparent lens and a water-resistant membrane attached to the transparent lens and configured to cover the microphone of the installed electronic device. The transparent lens has a first side configured to face the electronic device when the electronic device is installed in the protective case and a second side opposite the first side. A first portion of the first side and a second portion of the second side are each coated with a light-blocking material. The first portion has an area greater than an area of the second portion.

U.S. Pat. No. 10,103,769 appears to disclose a protective enclosure for use with an electronic device that includes a bottom shell, a first cushioning member, and a second cushioning member. The bottom shell includes a back portion and walls attached to the back portion to form a cavity for receiving and removably retaining the electronic device. The bottom shell also includes an aperture configured to provide direct access to the touch screen of the installed electronic device. The first cushioning layer is overmolded onto at least the inner surface of the of back portion of the bottom shell and configured to contact and cushion at least a back surface of the installed electronic device. The second cushioning layer is separate from the first cushioning layer and includes a perimeter cushioning member overmolded onto at least a portion of the walls of the bottom shell.

U.S. Pat. No. 10,058,155 appears to disclose a protective case system that includes a mounting accessory and a protective case. The mounting accessory includes a dovetail rail member with a snap feature and an engagement feature. The protective case includes an inner liner for receiving and at least partially enclosing the electronic device when the electronic device is installed in the protective case, an outer shell extending around at least a portion of the inner liner, and a mount adapter removeably attached to the outer shell.

U.S. Pat. No. 9,369,170 appears to disclose a protective case for a mobile device that has a body removably disposed on the mobile device and a movable lens cover disposed on the body proximate to the first camera lens. The movable lens cover includes a first lens occlusion section and a first sensor access section. The movable lens cover can have at least two positions in relation to the mobile device. A fully exposed position exposes both the first camera lens and the at least one sensor of the mobile device, and a first partially occluded position disposes the first lens occlusion section over the first camera lens preventing light from reaching the first camera lens and disposes the first sensor access section over the at least one sensor allowing the at least one sensor to receive the input.

U.S. Pat. No. 9,078,498 appears to disclose a holder for a device that may have a receiver which captures an end of the device, and an engagement mechanism that may latch or secure the device into the holder. The holder may permit the device to be held in two or more different positions, and may secure the device in the holder when the holder may be oriented in several different orientations. The holder may operate in conjunction with a removable protective cover that may include features that interact with the engagement mechanism.

U.S. Pat. No. 7,581,893 appears to disclose an active lens cover for a device, such as a smart phone, with a dual lens camera. The camera lens that faces the user and the camera lens that faces away from the user are not directly behind each other, but are slightly offset. The active lens cover is advantageously in the shape of a "U", which allows a single cover to be used to protect both lenses. The offset arrangement of the two lenses allows the facing lens be exposed by sliding the lens cover in one direction, and the away lens to be exposed by sliding the lens cover in the opposite direction. When the lens cover is slid to expose the facing camera lens, the camera phone automatically turns ON and enters a pre-selected operating mode. When the cover is slid in the opposite direction to expose the away camera lens, the camera phone automatically turns ON and enters another pre-selected operating mode. The housing of the U-cover includes at least one sensor that tells the device's CPU what hardware to activate. In the preferred embodiment, the user is able to seamlessly switch between transmitting a video feed from either camera during a telephone call.

U.S. patent application Publication Number 2015/0146401 appears to disclose a case for a portable electronic device including a first surface, a second surface, and sides between the first surface and the second surface. The portable electronic device is adapted to electrically connect to an external electronic device, and includes: a cover portion adapted to couple to the first surface of the portable electronic device; a first interface at a first location on the cover portion adapted to electrically couple to the portable electronic device; a second interface at a second location on the cover portion adapted to electrically couple to the external electronic device; and a cable coupled to the first and second interfaces adapted to provide electrical communication between the first interface and the second interface.

U.S. patent application Publication Number 2014/0057687 appears to disclose a protective case for cellular phones. By letting the cellular phone be closely fixed by a cellular phone supporting fixture elastically fixed with springs and plate springs attached to a protection cover when holding the cellular phone, in order to be capable of accommodating and fixing a wide range of cellular phones which slightly differ in size, thickness, model and etc. between cellular phone supporting fixture and plate spring, and by pulling out a moving board where the cellular phone is kept upward a fixed board when taking photographs with the cellular phone, users are able to take photographs in the condition in which a camera lens of the cellular phone is exposed outside the cellular phone case. Diverse types and functions of wallet receptacles can be combined on the face outside the main body of the cellular phone case.

Chinese Patent Number CN205945826 appears to disclose a movable cellphone lens cover. The utility model discloses a cellphone case that includes a cellphone shell body, a cover, and a slide rail. The utility model provides a cellphone case that protects the camera lens with the cover to protect the camera lens from damage, as well as keep the camera lens clean.

While the above-identified patents and publications do appear to disclose various cases, enclosures, and assemblies for electronic devices, their configurations remain non-desirous and/or problematic inasmuch as, among other things, none of the above-identified cases, enclosures, and assemblies appear to enable a person to use the flash of the camera system as a flashlight while simultaneously preserving his/her night vision.

These and other objects of the present invention will become apparent in light of the present specification, claims, and drawings.

SUMMARY OF THE INVENTION

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

The present invention is directed to a case for use in association with an electronic device having a camera system with a flash that can serve as a flashlight, comprising: (a) a case body, wherein the case body is adapted to releasably retain the electronic device; and (b) a cover member, wherein the cover member is adapted to enable a person to use the flash of the camera system as a flashlight while simultaneously preserving his/her night vision.

In a preferred embodiment of the present invention, the case body includes an electronic device cavity defined by a left side wall, a right side wall, a top wall, and a bottom wall.

In another preferred embodiment of the present invention, the case body includes a camera system aperture.

In yet another preferred embodiment of the present invention, the case body includes a cover member cavity defined by a left side wall, a right side wall, a top wall, and a bottom wall, wherein the cover member cavity is adapted to releasably and slidably retain the cover member.

In one preferred embodiment of the present invention, the case body is fabricated from a material selected from the group consisting of a leather, a natural fabric, a synthetic fabric, a metal, a metal alloy, a natural resin, a synthetic resin, a plastic, a composite, and/or wood.

In a preferred aspect of the present invention, the cover member comprises a material that is transparent or substantially transparent (e.g., greater than 85%) in the visible region of the electromagnetic spectrum.

In a preferred embodiment of the present invention, the cover member filters light such that the predominant (e.g., majority as perceived by the human eye) color of light emitted is red.

In another preferred embodiment of the present invention, the cover member filters light such that the predominant wavelength emitted ranges from approximately (i.e., +/−10%) 625 nanometers to approximately (i.e., +/−10%) 740 nanometers during normal use.

In yet another preferred embodiment of the present invention, the cover member filters light such that the predominant color of light emitted is green.

In one preferred embodiment of the present invention, the cover member filters light such that the predominant wavelength emitted ranges from approximately (i.e., +/−10%) 520 nanometers to approximately (i.e., +/−10%) 565 nanometers during normal use.

In a preferred embodiment of the present invention, the cover member is fabricated from a material selected from the group consisting of borosilicate glass, soda lime glass, natural and synthetic polymeric resins, plastics, composites, polyesters, polyimides, polycarbonates, glass-clad polycarbonates, polysulfones, polyamides, polyethylene naphthalate, ethylene vinyl acetate, acrylate polymers, and/or cyclic olefin copolymers.

In another preferred embodiment of the present invention, the cover member is bifurcated into a first part and a second part, wherein the first part filters light such that the predominant color of light emitted is red, and the second part filters light such that the predominant color of light emitted is green.

In yet another preferred embodiment of the present invention, the cover member is bifurcated into a first part and a second part, wherein the first part filters light such that the predominant color of light emitted is red, and the second part is opaque and blocks the transmission of light.

In a preferred embodiment of the present invention, the cover member is trifurcated into a first part, a second part, and a third part, wherein the first part filters light such that the predominant color of light emitted is red, the second part filters light such that the predominant color of light emitted is green, and the third part is opaque and blocks the transmission of light.

In another preferred embodiment of the present invention, the cover member includes one or more ribs that are adapted to enhance and/or facilitate the lateral slidability of the same.

The present invention is also directed to a cover for use in association with an electronic device having a camera system with a flash that can serve as a flashlight, comprising, consisting essentially of and/or consisting of: a cover member, wherein the cover member is securable to the electronic device proximate the camera system, and wherein the cover member is adapted to enable a person to use the flash of the camera system as a flashlight while simultaneously preserving his/her night vision.

In a preferred embodiment of the present invention, the cover member filters light such that the predominant color of light emitted is red.

The present invention is further directed to an assembly for use in association with an electronic device having a camera system with a flash that can serve as a flashlight, comprising, consisting essentially of and/or consisting of: (a) a first attachment member; (b) a second attachment member; (c) a connecting member; (d) a cover member, wherein the cover member is adapted to enable a person to use a flash of a camera system as a flashlight while simultaneously preserving his/her night vision during normal use; and (e) wherein the connecting member is secured to the first and second attachment members, and wherein the cover member is adapted to slide laterally between the first and second attachment members.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted.

It will be further understood that the invention is not necessarily limited to the particular embodiments illustrated herein.

Figure 1:
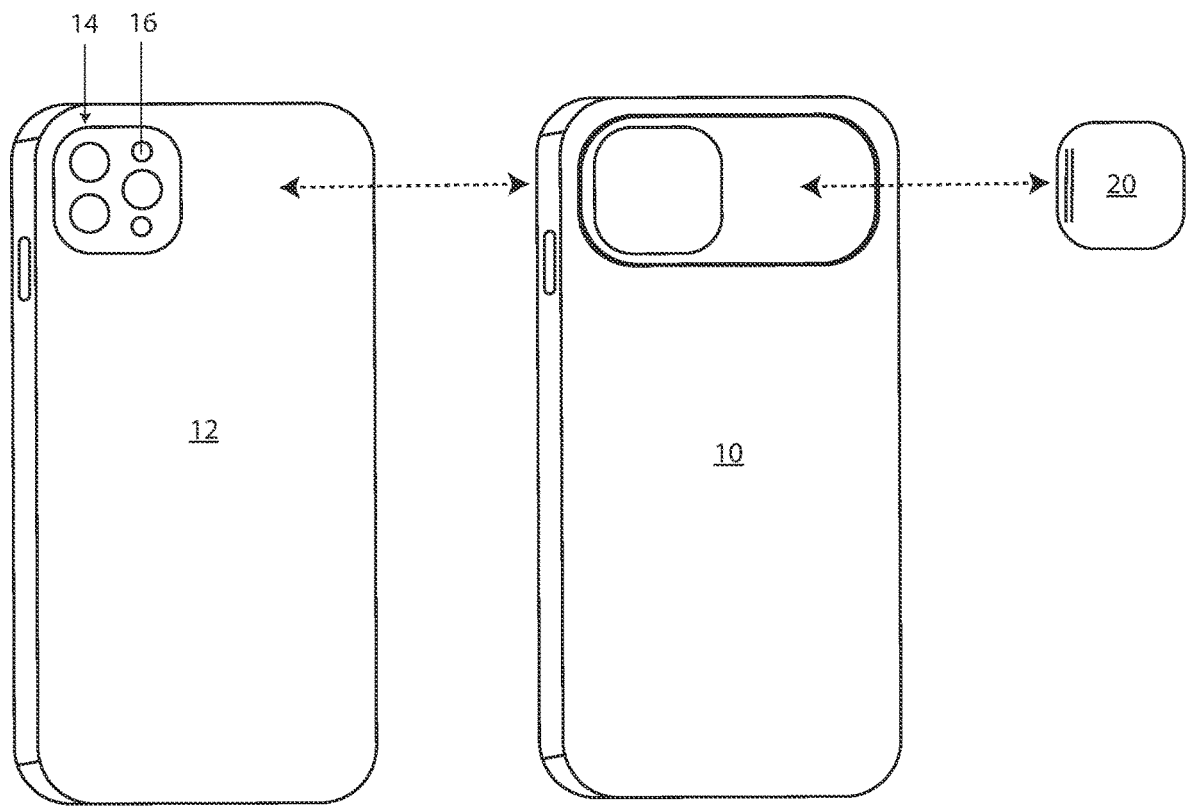
Figure 2:
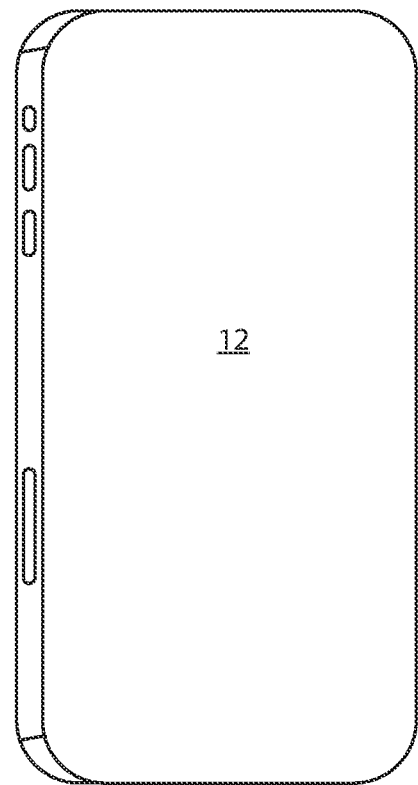
Figure 3:
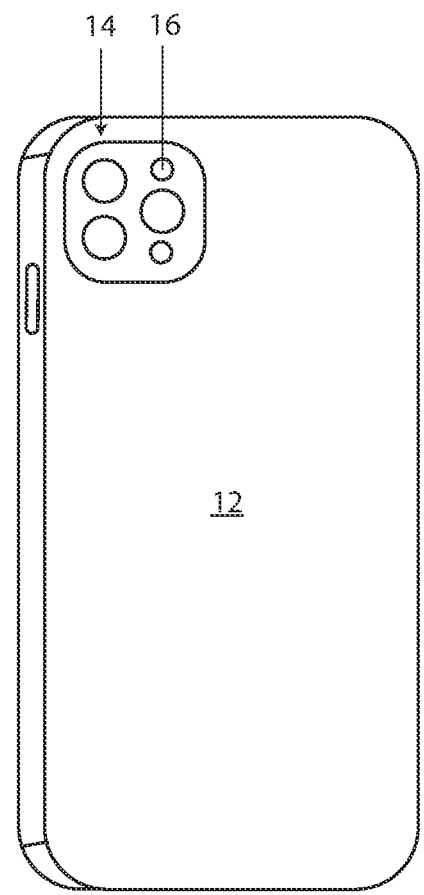
Figure 4:
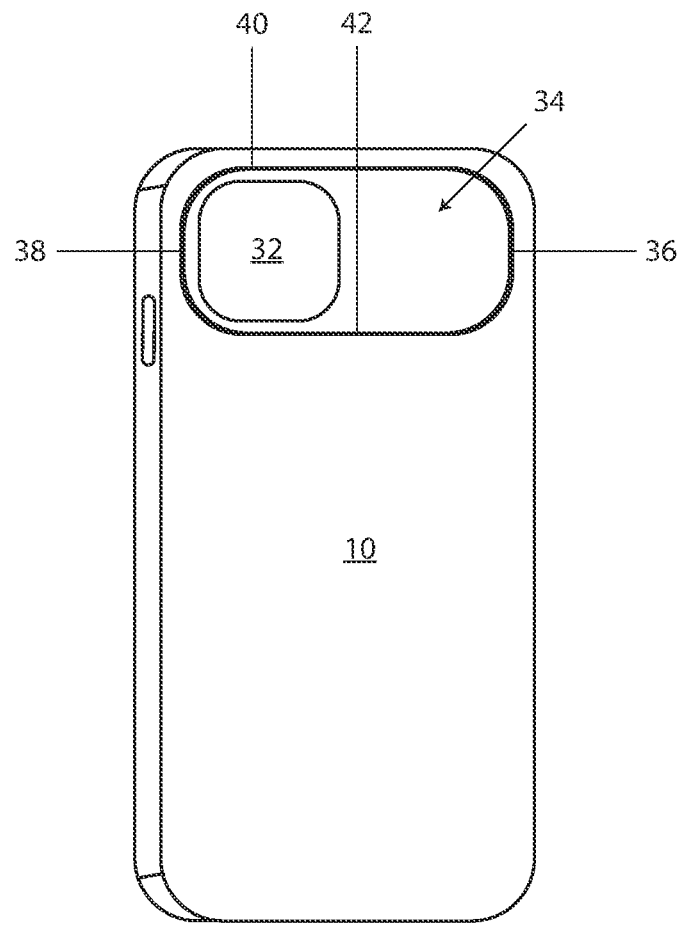
Figure 5:
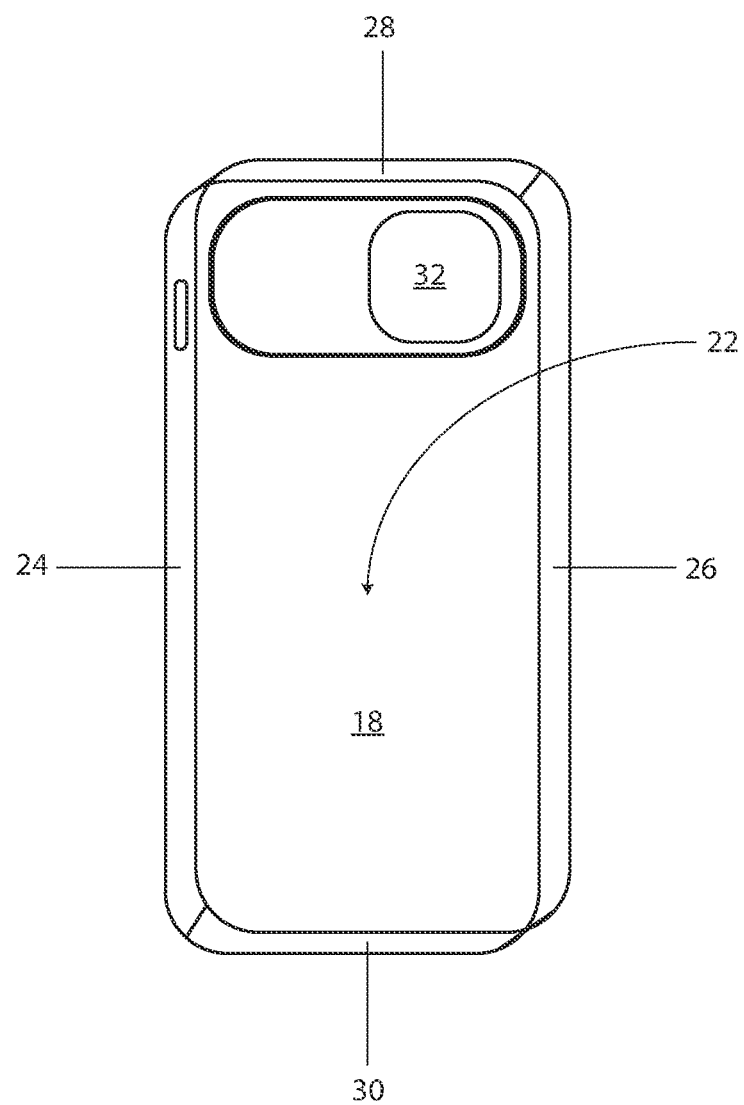
Figure 6:
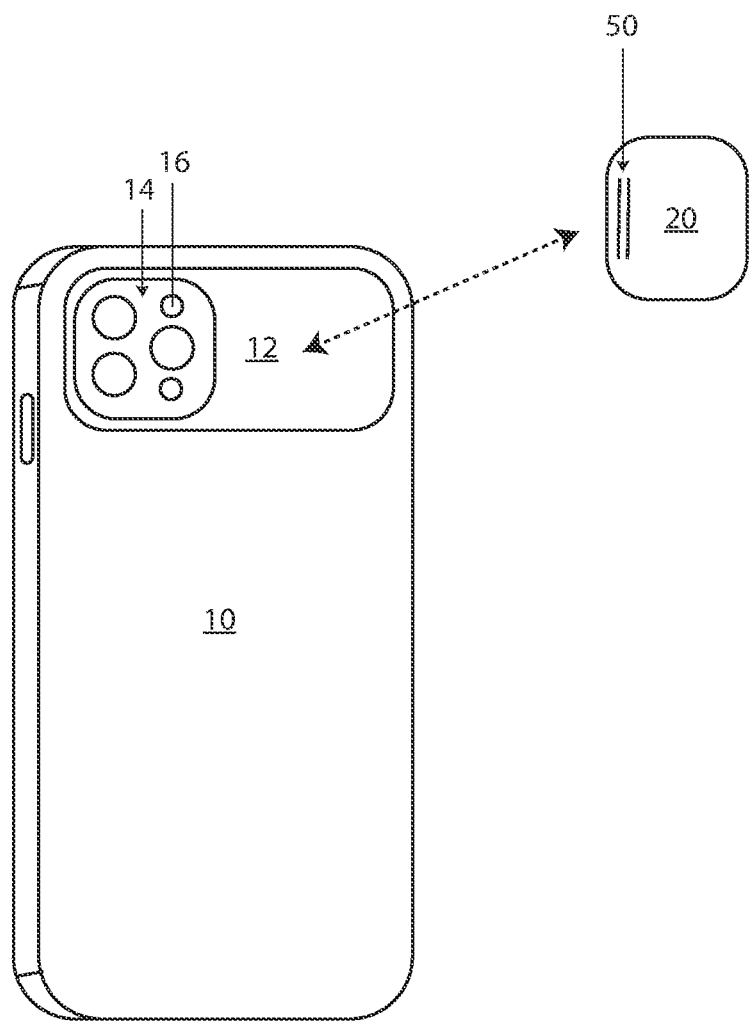
Figure 7:
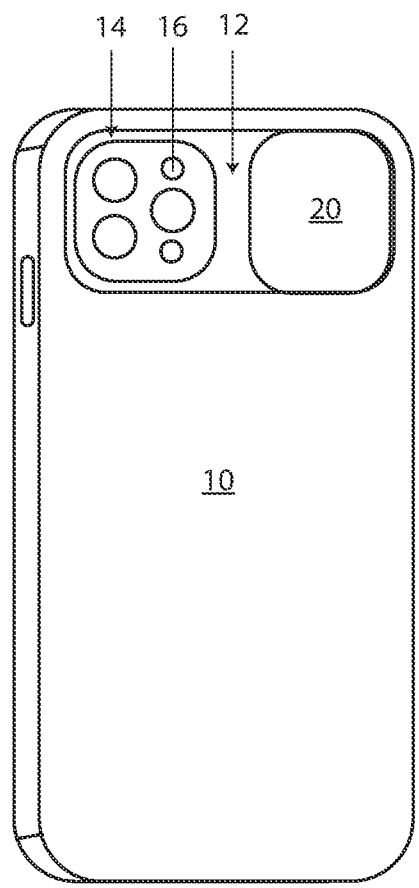
Figure 8:
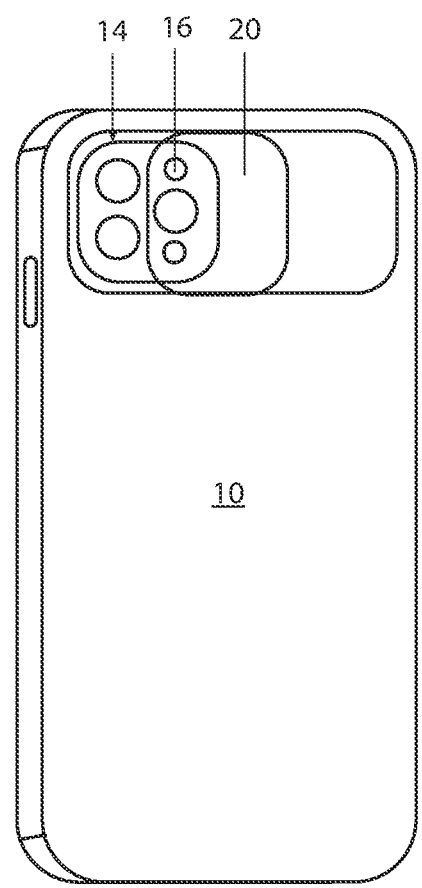
Figure 9:
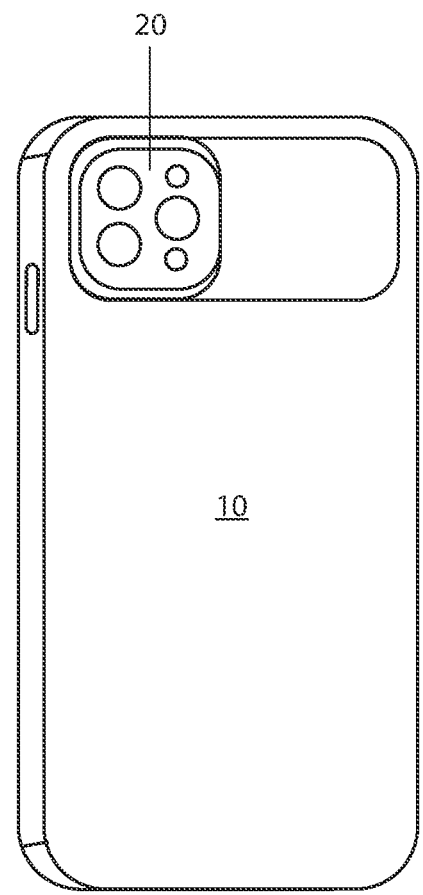
Figure 10:
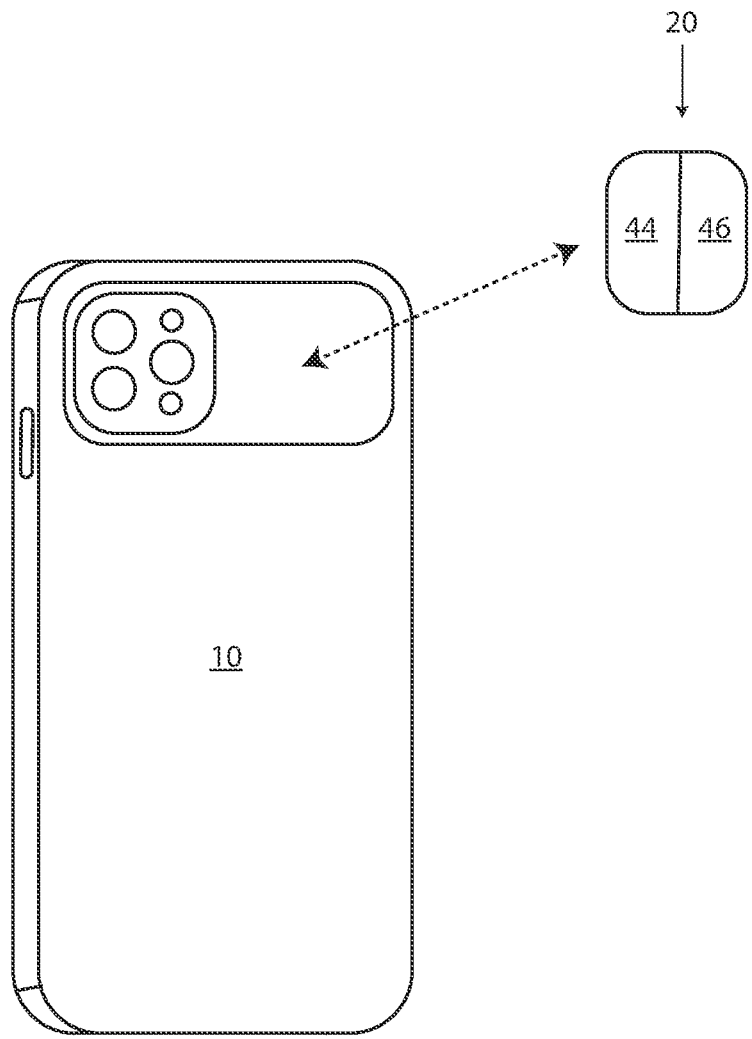
Figure 11:
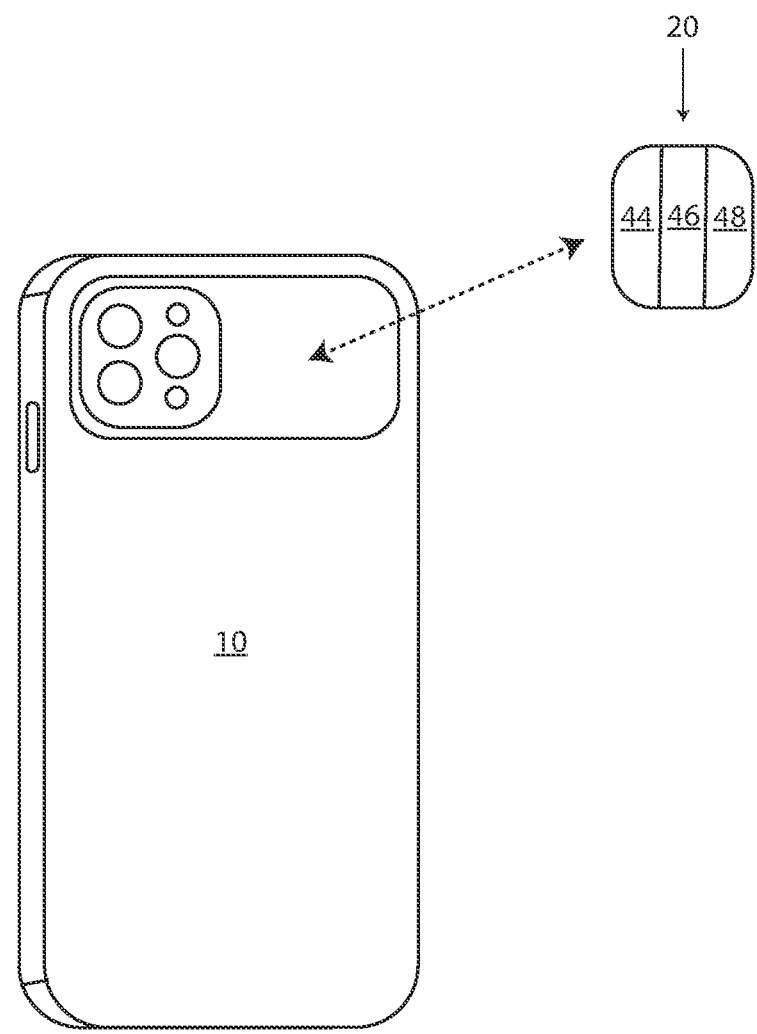
Figure 12:
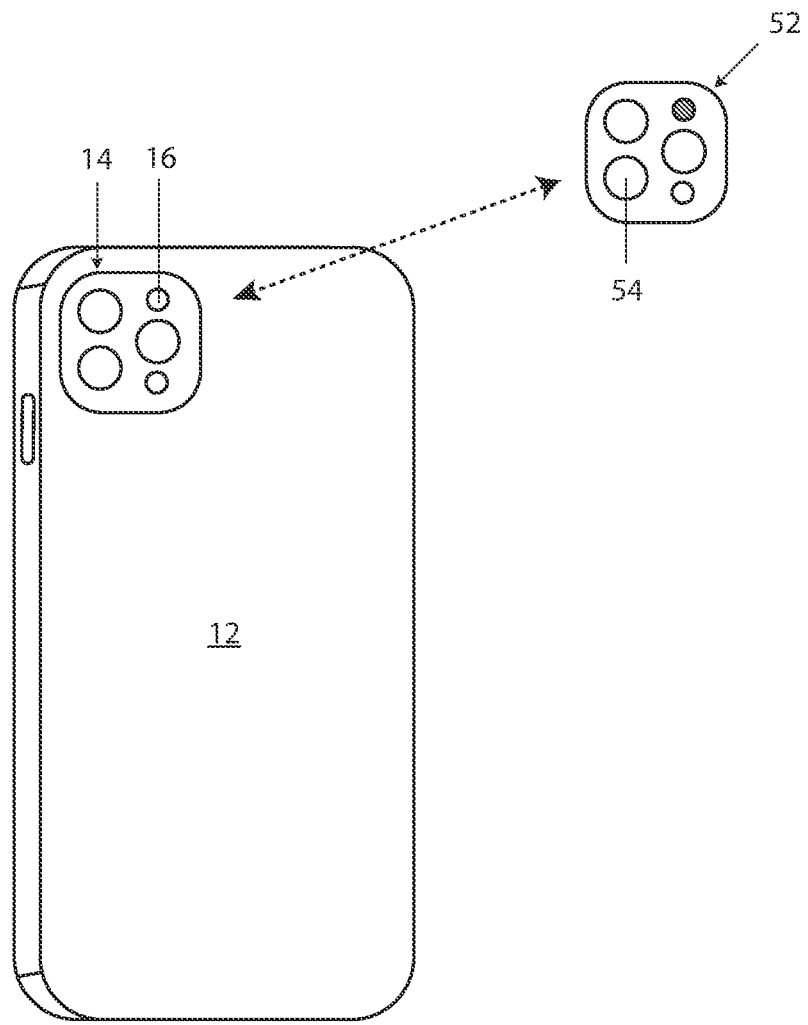
Figure 13:
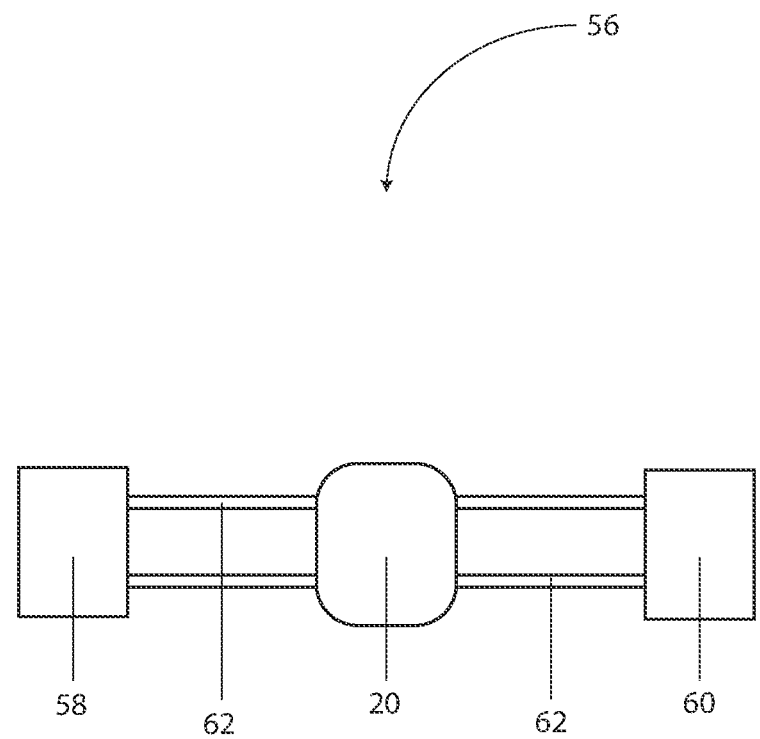
Figure 14:
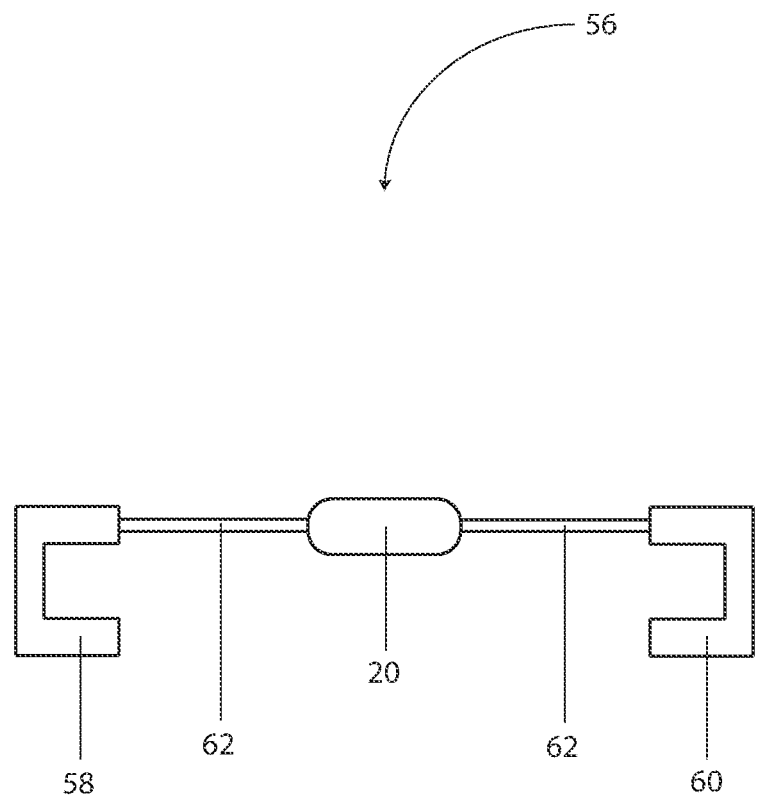
Figure 15:
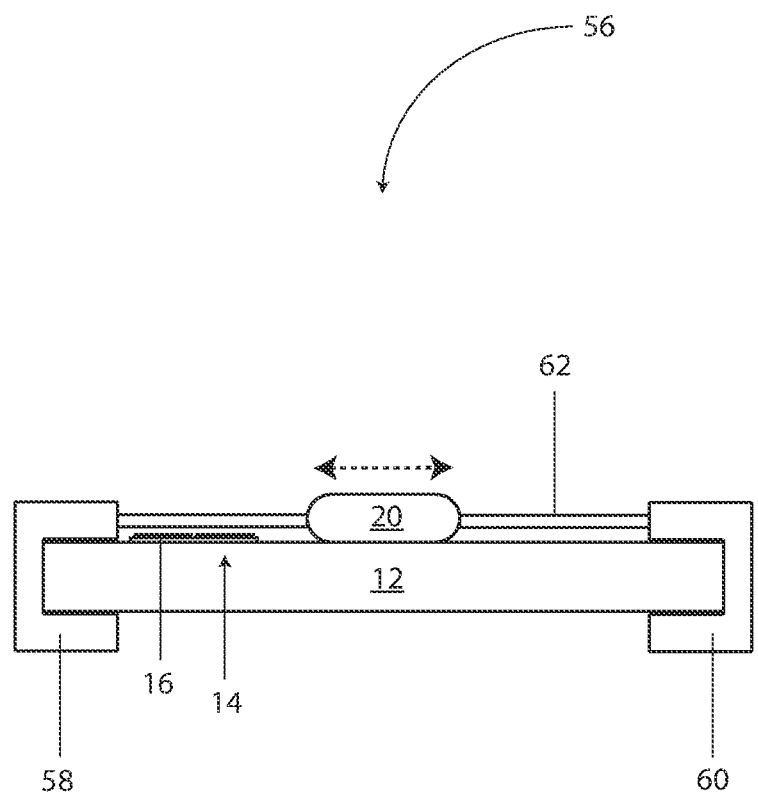
Figure 16:
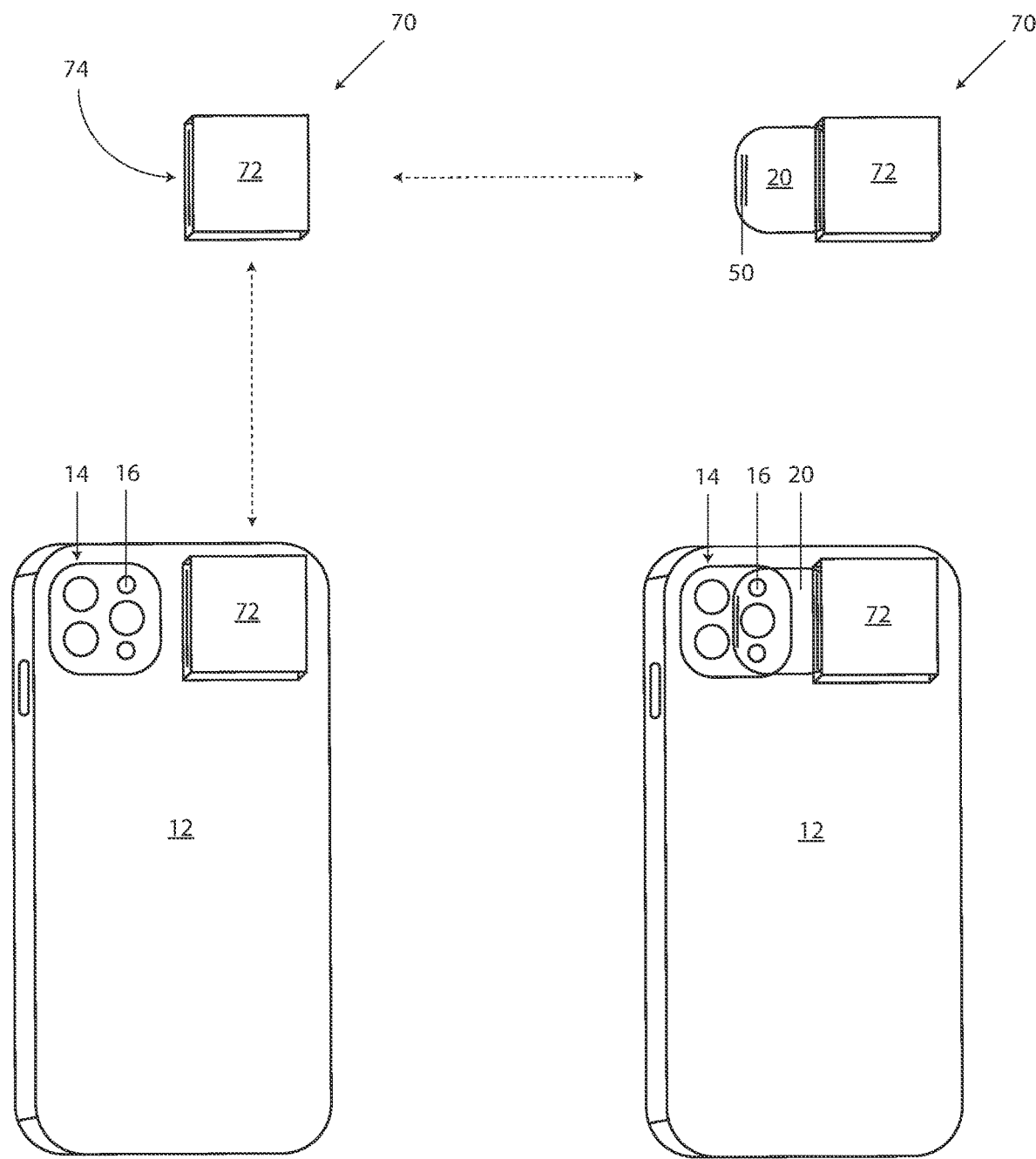

The invention will now be described with reference to the drawings wherein:

FIG. 1 of the drawings is an exploded perspective view of an embodiment of a case and cover member associated with an electronic device (e.g., smart phone) having a camera system with a flash that can serve as a flashlight;

FIG. 2 of the drawings is a front perspective view of an electronic device (e.g., smart phone) for use in association with a case of the present invention;

FIG. 3 of the drawings is a rear perspective view of an electronic device (e.g., smart phone) for use in association with a case of the present invention;

FIG. 4 of the drawings is a rear perspective view of a case manufactured in accordance with the present invention;

FIG. 5 of the drawings is a front perspective view of a case manufactured in accordance with the present invention;

FIG. 6 of the drawings is a perspective view of an embodiment of an electronic device (e.g., smart phone) having a camera system with a flash that can serve as a flashlight positioned within the case of the present invention, showing a cover member releasably associated therewith;

FIG. 7 of the drawings is a perspective view of an embodiment of an electronic device (e.g., smart phone) having a camera system with a flash that can serve as a flashlight positioned within the case of the present invention, showing the cover member in a first or open position;

FIG. 8 of the drawings is a perspective view of an embodiment of an electronic device (e.g., smart phone) having a camera system with a flash that can serve as a flashlight positioned within the case of the present invention, showing the cover member in a second or partially closed position;

FIG. 9 of the drawings is a perspective view of an embodiment of an electronic device (e.g., smart phone) having a camera system with a flash that can serve as a flashlight positioned within the case of the present invention, showing the cover member in a third or fully closed position;

FIG. 10 of the drawings is a perspective view of an embodiment of an electronic device (e.g., smart phone) having a camera system with a flash that can serve as a flashlight positioned within the case of the present invention, showing a bifurcated cover member releasably associated therewith;

FIG. 11 of the drawings is a perspective view of an embodiment of an electronic device (e.g., smart phone) having a camera system with a flash that can serve as a flashlight positioned within the case of the present invention, showing a trifurcated cover member releasably associated therewith;

FIG. 12 of the drawings is a perspective view of an embodiment of an electronic device (e.g., smart phone) having a camera system with a flash that can serve as a flashlight releasably associated with a cover member that generally conforms to the geometry of the camera system;

FIG. 13 of the drawings is a top plan view of an assembly for use in association with an electronic device having a camera system with a flash that can serve as a flashlight;

FIG. 14 of the drawings is a side view of the assembly of FIG. 13;

FIG. 15 of the drawings is a side view of the assembly of FIG. 13 shown in association with an electronic device having a camera system with a flash that can serve as a flashlight; and FIG. 16 of the drawings is a plurality of perspective views of an alternative embodiment of an assembly for use in association with an electronic device having a camera system with a flash that can serve as a flashlight.

DETAILED DESCRIPTION OF THE INVENTION

While this invention is susceptible of embodiment in many different forms and applications, there are shown in the drawings and described herein in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of one or more embodiments of the invention, and some of the components may have been distorted from their actual scale for purposes of pictorial clarity.

Referring now to the drawings, and to FIGS. 1-5 in particular, a first embodiment of case 10, for use in association with electronic device 12 having camera system 14 with flash 16 that can serve as a flashlight, is shown as generally comprising case body 18 and cover member 20. In accordance with the present invention, when a user activates the flashlight of the electronic device, the cover member modifies the output light, as perceived by the user, so it does not adversely affect the night vision of the user.

As is best shown in FIGS. 4-5, case 10 is adapted to releasably retain electronic device 12 and includes electronic device cavity 22 defined by left side wall 24, right side wall 26, top wall 28, and bottom wall 30. Case 10 also includes camera system aperture 32.

Referring now to FIG. 4, case body 18 includes cover member cavity 34 defined generally by left side wall 36, right side wall 38, top wall 40, and bottom wall 42. Cover member cavity 34 is adapted to releasably and slidably retain cover member 20 (See FIGS. 6-9).

In accordance with the present invention, case body 18 is preferably fabricated from a material selected from the group consisting of a leather, a natural fabric, a synthetic fabric, a metal, a metal alloy, a natural resin, a synthetic resin, a plastic, a composite, and/or wood.

Cover member 20 may be fabricated from any one of a number of materials that are preferably transparent or substantially transparent in the visible region of the electromagnetic spectrum, such as, for example, borosilicate glass, soda lime glass, natural and synthetic polymeric resins, plastics, and/or composites including polyesters (e.g. PET), polyimides (PI), polycarbonates, glass-clad polycarbonates (GCP) polysulfones, polyamides, polyethylene naphthalate (PEN), ethylene vinyl acetate (EVA), acrylate polymers, as well as Topas®, which is commercially available from Ticona of Summit, N.J.. Cover member 20 is preferably fabricated from a sheet of glass having a thickness ranging from approximately 0.10 millimeters (mm) to approximately 12.7 mm, more preferably from approximately 0.50 mm to approximately 1.50 mm, and yet more preferably from approximately 0.60 mm to approximately 1.00 mm. Of course, the thickness of the cover will depend largely upon the particular application of flashlight. While particular substrate materials have been disclosed, for illustrative purposes only, it will be understood that numerous other substrate materials are likewise contemplated for use—so long as the materials are at least substantially transparent and exhibit appropriate physical properties, such as strength, to be able to operate effectively in conditions of intended use. Indeed, the cover members of the present invention can be, during normal operation, exposed to extreme temperature variation as well as substantial UV radiation, emanating primarily from the sun. It will be further understood that cover member 20 may comprise a UV absorbing layer and/or contain a UV absorbing material to help protect components of the camera system from UV damage.

In one embodiment of the present invention, cover member 20 filters light such that the predominant color of light emitted from the flashlight is red. In this embodiment, the cover member filters light such that the predominant wavelength emitted ranges from approximately 625 nanometers to approximately 740 nanometers during normal use.

In another embodiment of the present invention, cover member 20 filters light such that the predominant color of light emitted from the flashlight is green. In this embodiment, the cover member filters light such that the predominant wavelength emitted ranges from approximately 520 nanometers to approximately 565 nanometers during normal use.

As is best shown in FIG. 10, cover member 20 can be bifurcated into first part 44 and second part 46. Preferably, the first part filters light such that the predominant color of light emitted is red, and the second part filters light such that the predominant color of light emitted is green. Alternatively, cover member can be bifurcated into a first part and a second part, wherein the first part filters light such that the predominant color of light emitted is red, and the second part is opaque and blocks the transmission of light.

Referring now to FIG. 11, cover member 20 can also be trifurcated into first part 44, second part 46, and third part 48, wherein the first part filters light such that the predominant color of light emitted is red, the second part filters light such that the predominant color of light emitted is green, and the third part is opaque and blocks the transmission of light.

Referring back to FIG. 6, cover member 20 can include one or more ribs 50 that are adapted to enhance the lateral slidability of the cover member.

As is best shown in FIG. 12, the present invention is also directed to cover 52 for use in association with electronic device 12 having camera system 14 with flash 16 that can serve as a flashlight. Cover 52 is securable to the electronic device proximate the camera system preferably via an adhesive and/or electrostatic forces. Cover 52 is adapted to enable a person to use the flash of the camera system as a flashlight while simultaneously preserving his/her night vision. At least the portion of cover 52 that overlays flash 16 can be fabricated from the same material and have the same properties as cover member 20. Cover 52 includes a plurality of apertures 54 for accommodating lenses of the camera system.

As is best shown in FIGS. 13-15, the present invention is also directed to assembly 56 for use in association with electronic device 12 having camera system 14 with flash 16 that can serve as a flashlight. Assembly 56 preferably includes first attachment member 58, second attachment member 60, connecting member 62, and cover member 20. Cover member 20 is adapted to enable a person to use the flash of the camera system as a flashlight while simultaneously preserving his/her night vision during normal use. Connecting member 62 is preferably secured to first and second attachment members 58 and respectively, and is adapted to slide laterally between the first and second attachment members.

Referring now to FIG. 16, the present invention is yet further directed to assembly 70 for use in association with electronic device 12 having camera system 14 with flash 16 that can serve as a flashlight. Assembly 70 preferably includes housing or body 72 having aperture 74 and slidable cover member 20.

Body 72 preferably includes a cavity for containing cover member 20 which is generally defined by a front wall, a back wall, a left side wall, a right side wall, a top wall, and a bottom wall. While body 72 has been shown as being square, it will be understood that other peripheral geometries (e.g., circular, oval, triangular, square, rectangular, pentagonal, hexagonal, octagonal, polygonal, etcetera) and design configurations are likewise contemplated for use in accordance with the present invention. The same is true for cover member 20. The bottom wall of body 72 preferably includes an adhesive (e.g., glue, double sided tape, etcetera) for securement to electronic device 12. Assembly 70 is preferably positioned adjacent (e.g., above, below, next to, to the right of, to the left of, etcetera) to camera system 14 of electronic device 12 depending largely upon the placement of the camera system.

In accordance with the present invention, cover member 20 of assembly 70 is adapted to enable a person to use the flash of the camera system as a flashlight while simultaneously preserving his/her night vision during normal use. Cover member 20 can include one or more ribs 50 that are adapted to enhance the lateral slidability of the cover member.

The foregoing description merely explains and illustrates the invention and the invention is not limited thereto except insofar as the appended claims are so limited, as those skilled in the art who have the disclosure before them will be able to make modifications without departing from the scope of the invention.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etcetera shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etcetera. As a non-limiting example, each range discussed herein can be readily broken down into a lower third, middle third and upper third, etcetera. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed and desired to be secured by Letters Patent of the United States is:

1. A case for use in association with an electronic device having a camera system with a flash that can serve as a flashlight, comprising:
    a case body, wherein the case body is adapted to releasably retain the electronic device; and
    a cover member, wherein the cover member completely covers the flash to prevent the leakage of unfiltered light, and wherein the cover member is adapted to enable a person to use the flash of the camera system as a flashlight while simultaneously preserving his/her night vision.

2. The case according to claim 1, wherein the case body includes an electronic device cavity defined by a left side wall, a right side wall, a top wall, and a bottom wall.

3. The case according to claim 1, wherein the case body includes a camera system aperture.

4. The case according to claim 1, wherein the case body includes a cover member cavity defined by a left side wall, a right side wall, a top wall, and a bottom wall, wherein the cover member cavity is adapted to releasably and slidably retain the cover member.

5. The case according to claim 1, wherein the case body is fabricated from a material selected from the group consisting of a leather, a natural fabric, a synthetic fabric, a metal, a metal alloy, a natural resin, a synthetic resin, a plastic, a composite, and/or wood.

6. The case according to claim 1, wherein the cover member comprises a material that is transparent or substantially transparent in the visible region of the electromagnetic spectrum.

7. The case according to claim 1, wherein the cover member filters light such that the predominant color of light emitted is red.

8. The case according to claim 1, wherein the cover member filters light such that the predominant wavelength emitted ranges from approximately 625 nanometers to approximately 740 nanometers during normal use.

9. The case according to claim 1, wherein the cover member filters light such that the predominant color of light emitted is green.

10. The case according to claim 1, wherein the cover member filters light such that the predominant wavelength emitted ranges from approximately 520 nanometers to approximately 565 nanometers during normal use.

11. The case according to claim 1, wherein the cover member is fabricated from a material selected from the group consisting of borosilicate glass, soda lime glass, natural and synthetic polymeric resins, plastics, composites, polyesters, polyimides, polycarbonates, glass-clad polycarbonates, polysulfones, polyamides, polyethylene naphthalate, ethylene vinyl acetate, acrylate polymers, and/or cyclic olefin copolymers.

12. The case according to claim 1, wherein the cover member is bifurcated into a first part and a second part, wherein the first part filters light such that the predominant color of light emitted is red, and the second part filters light such that the predominant color of light emitted is green.

13. The case according to claim 1, wherein the cover member is bifurcated into a first part and a second part, wherein the first part filters light such that the predominant color of light emitted is red, and the second part is opaque and blocks the transmission of light.

14. The case according to claim 1, wherein the cover member is trifurcated into a first part, a second part, and a third part, wherein the first part filters light such that the predominant color of light emitted is red, the second part filters light such that the predominant color of light emitted is green, and the third part is opaque and blocks the transmission of light.

15. The case according to claim 1, wherein the cover member includes one or more ribs that are adapted to enhance the lateral slidability of the same.

16. The cover according to claim 1, wherein the cover member filters light such that the predominant color of light emitted is red.

17. A cover for use in association with an electronic device having a camera system with a flash that can serve as a flashlight, comprising:
    a cover member, wherein the cover member is securable to the electronic device proximate the camera system, wherein the cover member completely covers the flash to prevent the leakage of unfiltered light, and wherein the cover member is adapted to enable a person to use the flash of the camera system as a flashlight while simultaneously preserving his/her night vision.

\* \* \* \* \*